United States Patent [19]

Boulter et al.

[11] Patent Number: 4,582,749
[45] Date of Patent: Apr. 15, 1986

[54] SLOT ARMOR FOR DYNAMOELECTRIC MACHINES

[75] Inventors: Edward A. Boulter, Rockport; Scott K. Derderian, Salem, both of Mass.

[73] Assignee: General Electric Company, Lynn, Mass.

[21] Appl. No.: 592,027

[22] Filed: Mar. 22, 1984

[51] Int. Cl.⁴ .................. B32B 27/34; H02K 3/34
[52] U.S. Cl. .................................. 428/287; 310/215; 428/286; 428/421; 428/422; 428/473.5
[58] Field of Search .............. 428/285, 286, 287, 417, 428/421, 422, 251, 246, 268, 435, 473.5; 310/43, 215; 174/137 B, 137 R, 137 A

[56] References Cited

U.S. PATENT DOCUMENTS

| | | | |
|---|---|---|---|
| 3,425,865 | 2/1969 | Shelton, Jr. | 428/473.5 X |
| 3,592,714 | 7/1971 | Katz | 428/473.5 X |
| 3,679,926 | 7/1972 | Simmonds | 310/215 |
| 3,974,314 | 8/1976 | Fuchs | 428/212 |
| 4,162,340 | 7/1979 | Fuchs | 428/83 |
| 4,400,226 | 8/1983 | Horrigan | 428/473.5 |

FOREIGN PATENT DOCUMENTS

| | | | |
|---|---|---|---|
| 20202 | 2/1977 | Japan | 310/215 |
| 122803 | 9/1979 | Japan | 310/215 |
| 1039967 | 8/1966 | United Kingdom | 428/473.5 |

Primary Examiner—Lorraine T. Kendell
Attorney, Agent, or Firm—James W. Mitchell

[57] ABSTRACT

A slot armor for insulating the slots in the rotor of a dynamoelectric machine from the windings contained in the slots includes a high-dielectric film on at least one surface thereof. A layer of a tough lubricating solid is coated on the exterior surface of the film. The lubricating solid prevents abrasion of the film by radial motion of the windings with respect to the slot armor or radial motion of the slot armor with respect to the slots. In the preferred embodiment of the invention, a substrate of glass fiber/epoxy composite has a polyimide polymer film bonded to the surface thereof. The lubricating solid coating on the external surface of the polyimide polymer film is an FEP fluorocarbon.

8 Claims, 6 Drawing Figures

SLOT ARMOR FOR DYNAMOELECTRIC MACHINES

BACKGROUND OF THE INVENTION

The present invention relates to insulation materials and, more particularly, to laminated molded insulation material for slot insulation in dynamoelectric machines.

Although the present invention is applicable to dynamoelectric machines functioning as either motors or generators, for concreteness of description, the following disclosure is directed to a slot armor for an electric generator. It will be understood that the problems to be solved and the embodiments of the invention disclosed herein to solve such problems are equally applicable to appropriate motors.

Industrial and utility electric generators are conventionally constructed with a DC field winding disposed in the rotor and AC windings disposed in the stator surrounding the rotor. The rotor is typically a large, one-piece metal forging having axial slots machined in its surface. Copper conductors are longitudinally disposed in the axial slots for providing DC excitation to the rotor. The copper conductors extend axially beyond the slots in order to permit the formation of end turns for interconnecting the copper conductors into a closed circuit and for providing connection to slip rings which supply the excitation power.

An insulating slot armor is conventionally disposed between the copper conductors and the sides of the slot in order to prevent grounding the excitation voltage to the rotor forging and also to withstand electric fields present in the rotor. In the electric generators of interest, the slot armor is a rigid molded insulating material which may take the form of two L-shaped molded structures disposed in the slot with the short legs of the L shapes facing each other in the bottom of the slot.

One slot armor of the prior art is disclosed in U.S. Pat. No. 3,974,314 which employs a high-dielectric film protected on each side by a layer of an unwoven aramid paper such as, for example, an aramid paper sold under the name Nomex. Further protective layers of a glass-fiber/epoxy laminate are disposed on the outside of each layer of aramid paper to form, at the least, a five-layer sandwich with the high-dielectric film in the center between, first the two aramid-paper layers, and then the two glass fiber/epoxy layers. Conventionally, each glass fiber/epoxy layer may be laid up as a single layer or multiple plies of woven or non-woven fabric or combinations of woven and non-woven fabric as required.

A corresponding slot armor is disclosed in U.S. Pat. No. 4,162,340 which adds thickening plies of glass fiber/epoxy at desired locations. The fundamental sequence of materials in this material is the same as in the previously referenced patent, that is, a central high-dielectric film protected by aramid paper and glass fiber/epoxy layers.

The amount of copper required to conduct the DC excitation power in a typical generator rotor is quite massive. When such large mass is combined with a high rotational speed of, for example, 3600 RPM, the copper experiences a large radial acceleration tending to force it radially outward. To resist the outward forces developed by the radial acceleration, the portions of the copper conductors that lie within the axial slots are wedged tightly in position using machined wedges fitting into dovetail slots machined into the radially outer extremities of the slots.

The portions of the copper conductors extending axially beyond the axial slots of the rotor forging to form the end turns are held in place against radial forces by retaining rings at each end of the rotor. One conventional generator employs a disk-shaped centering ring shrink-fitted onto the generator shaft axially outward from the end turns and a cylindrical retaining ring shrink-fitted at its axially outer extremity onto the centering ring. When a rotor of this construction is started, the radially outward forces applied to the retaining ring by the copper conductors are sufficient to expand the axially inner end of the retaining ring as much as a few thousandths of an inch. This expansion permits the copper conductors to also move outward slightly. The motion of the copper conductors may include portions just inside the axial slots as well as portions just outside the axial slots.

A base-load electric generator is one which, once it is started and placed on line, often remains in constant operation without stopping for periods measured in years. A peaking generator, on the contrary, is started up from a stop whenever its output power is needed to augment the power of the base load system. When its power output is no longer required, a peaking generator may be stopped. An industrial generator may be similarly operated.

We have observed that, after a few hundred to a few thousand start-stop cycles of a peaking or industrial generator, the glass fiber outer layers of the slot armor of the prior art become abraded just inside and just outside the axial slots by the friction between themselves and the copper conductors or between themselves and the sides of the slots. As the slot armor is abraded away, its insulating porperties become degraded. Such degradation of the insulating properties can eventually lead to electrical breakdown through the slot armor. We believe that the observed abrasion of the slot armor occurs due to the above-described radially outward motion of the copper conductors during generator startup and the corresponding radially inward motion during stopping.

The layers of aramid paper included in prior art slot armors contributes some undesirable properties to the slot armor. The aramid paper layer is sometimes not well bonded in the thickness dimension and therefore permits interlaminar bubbles and separation to form. In addition, the aramid paper layer provides substantial thermal insulation which resists the discharge of heat from the copper conductors through the slot armor to the rotor forging.

OBJECTS AND SUMMARY OF THE INVENTION

Accordingly, it is an object of the invention to provide a slot armor for a rotor of a dynamoelectric machine which overcomes the drawbacks of the prior art.

It is a further object of the invention to provide a slot armor for a rotor of a dynamoelectric machine which employs a high-dielectric film having an FEP fluorocarbon coating on at least one external surface thereof.

It is a still further object of the invention to provide a slot armor for a rotor of a dynamoelectric machine in which a hard, fiber-reinforced composite material has at least one of its surfaces covered by a high-dielectric plastic film which includes at least one lubricating outer surface of a fluorocarbon.

Briefly stated, the present invention provides a slot armor for insulating the slots in the rotor of a dynamoelectric machine from the windings contained in the slots which includes a high-dielectric film on at least one surface thereof. A layer of a tough lubricating solid is coated on the exterior surface of the film. The lubricating solid prevents abrasion of the film by radial motion of the windings with respect to the slot armor or radial motion of the slot armor with respect to the slots. In the preferred embodiment of the invention, a substrate of glass fiber/epoxy composite has a polyimide polymer film bonded to the surface thereof. The lubricating solid coating on the external surface of the polyimide polymer film is an FEP fluorocarbon.

According to an embodiment of the invention, there is provided a slot armor material comprising a layer of a cured, hard, fiber-reinforced composite material, at least a first dielectric film bonded to at least a first surface of the layer, the at least a first dielectric film being substantially co-extensive with the layer and a solid lubricating coating on an external surface of the at least a first dielectric film, the solid lubricating coating being effective to permit lubricated sliding contact with the dielectric film without permitting substantial abrasion thereof.

According to a feature of the invention, there is provided a slot armor for separating a conductor of a dynamoelectric machine from a slot in a rotor containing the conductor, comprising a first layer of a hard, cured glass fiber/epoxy composite material, a second layer of a polyimide high-dielectric film bonded to an exterior surface of the first layer, the second layer being substantially co-extensive with the first layer, the exterior surface being a surface facing the conductor in the dynamoelectric machine and a lubricating coating of an FEP fluorocarbon on an exterior surface of the film, the lubricating coating being effective to permit lubricated sliding contact between the conductor and the film without permitting substantial abrasion thereof.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
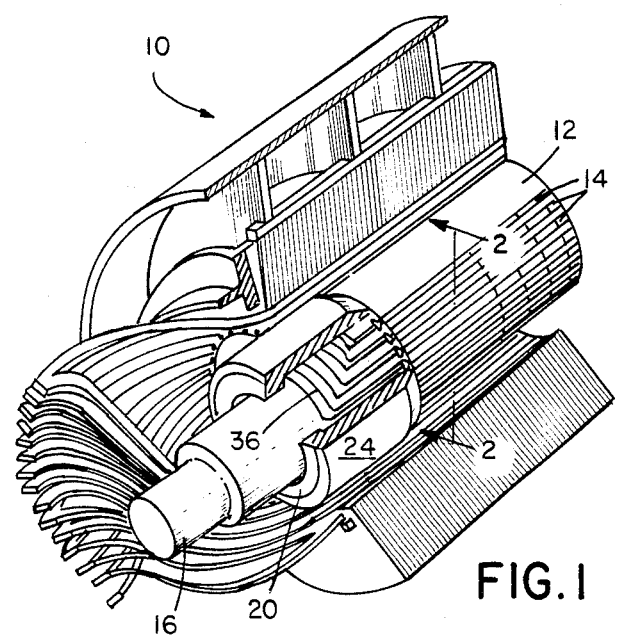
FIG. 1 is a cutaway perspective view of a portion of a dynamoelectric machine to which the slot armor of the present invention may be applied.

Referring first to FIG. 1, there is shown, generally at 10, a cross section of a dynamoelectric machine. A rotor forging 12 includes a plurality of axial slots 14 machined into its surface. There are reduced diameter shaft portions 16 (only one of which is shown), at opposite ends of the rotor, conventionally integrally formed with rotor forging 12 and extending axially from rotor 10 for support by conventional bearings and for coupling to a prime mover (not shown). A centering ring 20 is shrunk-fit onto shaft 16. The axially outer end of a retaining ring 24 is shrunk-fit onto centering ring 20. Retaining ring 24 encloses and resists radially outward motion of end turns located within it as will be further detailed. Similarly, there is a corresponding other centering ring and retaining ring combination (not shown, at the opposite end of rotor 10.

Figure 2:
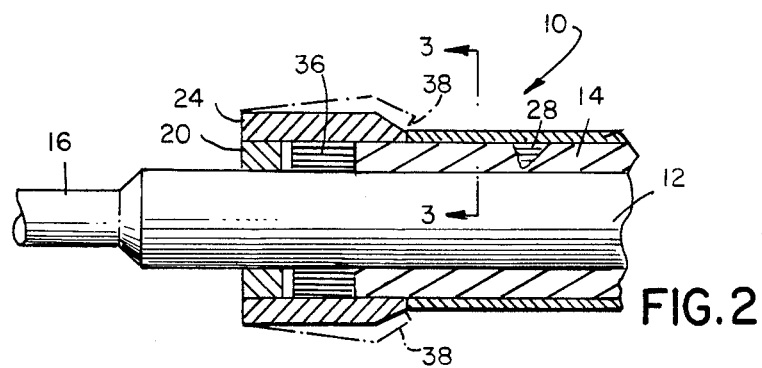
FIG. 2 is a cross section taken along II—II in FIG. 1.
Figure 3:
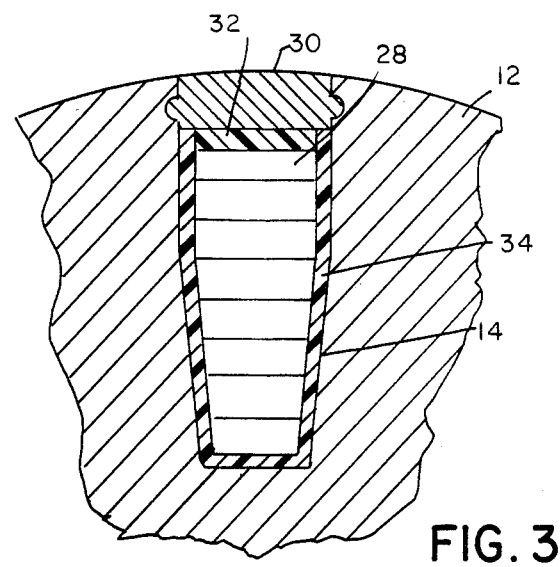
FIG. 3 is a cross section taken along III—III of FIG. 2.

Referring now to FIGS. 2 and 3, each axial slot 14 contains a plurality of copper conductors 28 secured therein by a wedge 30. A slot armor 34 encloses copper conductor 28 within axial slot 14 as well as for a substantial distance beyond axial slot 14. A creepage block 32 interposed between copper conductors 28 and wedge 30 provides insulation and helps retain copper conductors 28 in position within axial slot 14. Copper conductors 28 extend beyond slot armor 34 to form end turns 36 for interconnection of copper conductors 28 into a continuous electrical circuit as is conventional.

As previously noted, when rotor 10 is started up, an axially inner end 38 of retaining ring 24 expands slightly as indicated by the dashed lines in FIG. 2. This permits copper conductor 28 to move outward slightly during startup and to correspondingly move inward again during shutdown.

Figure 4:
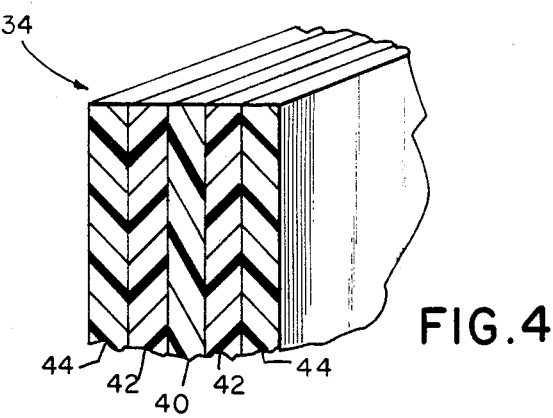
FIG. 4 is a perspective view of a slot armor according to the prior art.

Referring now to FIG. 4, there is shown a cross section of a slot armor 34 according to the prior art. A layer of high-dielectric film 40 which may be, for example, one of the types in the referenced patents, is centrally disposed in slot armor 34. Each side of layer of high-dielectric film 40 is bonded to a layer of non-woven aramid paper 42 such as, for example, an aramid paper sold under the trademark Nomex. A protective layer of a glass fiber/resin composite 44 is bonded to the outside surface of each layer of non-woven aramid paper 42 to complete slot armor 34. Each of the layers of slot armor 34 may, in fact, be formed of one or more layers of material to provide required characteristics of, for example, thickness using commercially available glass materials. As previously noted, abrasion can occur between glass fiber/resin composite 44 and either the walls of axial slot 14 or copper conductor 28 in the prior-art slot armor 34 shown in FIG. 4. After a few hundred to a few thousand startup/shutdown cycles, the glass fiber/resin composite 44 on the interior surfaces of slot armor 34 just inside and just outside axial slot 14 may become abraded and eroded due to the rubbing of copper conductors 28 on glass fiber/resin composite 44 of slot armor 34. Alternatively, or in addition, the glass fiber/resin composite 44 on the exterior surfaces of slot armor 34 may become abraded and eroded due to rubbing glass fiber/resin composite 44 of slot armor 34 on the inside surface of axial slot 14.

Figure 5:
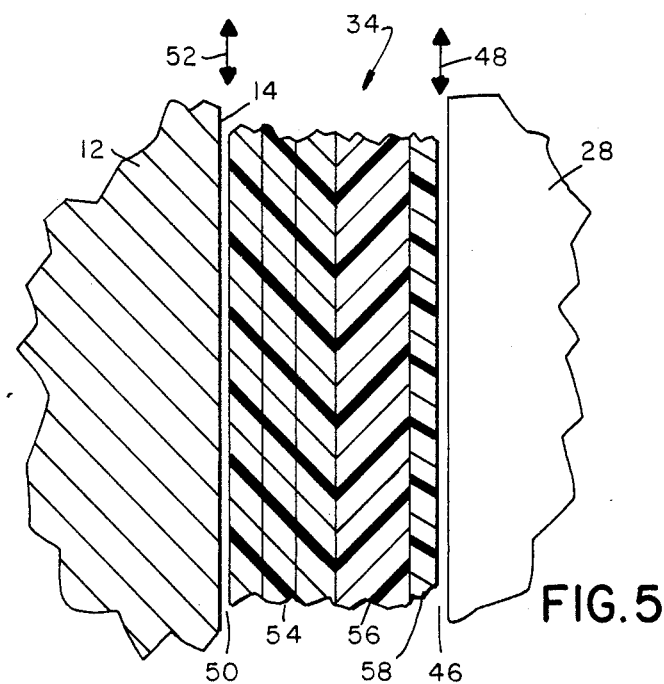
FIG. 5 is a close-up cross section of a slot armor according to an embodiment of the invention.

Referring now to FIG. 5, there is shown, a slot armor 34 according to an embodiment of the invention in place between a wall of an axial slot 14 and copper conductors 28 within axial slot 14. The thicknesses of the layers making up slot armor 34 are distorted for clarity of description. As previously noted, relative radial motion may occur between slot armor 34 and the elements beside it. Although not the only possibility, relative motion may take place at an interface 46 between slot armor 34 and copper conductor 28, especially near the point at which slot armor 34 and copper conductor 28 emerge from axial slot 14. This relative motion is shown by a double-headed arrow 48. Relative radial motion may also be encountered at an interface 50 between slot armor 34 and axial slot 14 as indicated by a double-headed arrow 52. Slot armor 34 of FIG. 5 is particularly adapted to resist damage due to relative motion at interface 46 between slot armor 34 and copper conductor 28.

A layer of hard fiber-reinforced composite material 54 has a dielectric film 56, co-extensive therewith, bonded to a surface thereof. A lubricating coating 58 is disposed on the surface of dielectric film 56 adjacent the interface 46 between slot armor 34 and copper conductor 28. Layer of hard fiber-reinforced composite material 54 is illustrated as a multi-layer composite resin material which is preferably a glass fiber/resin material. The resin in layer of hard fiber-reinforced composite material 54 is preferably a thermosetting resin. Most preferably, layer of hard fiber-reinforced composite material 54 is a glass fiber/epoxy composite having as high a percentage of glass fiber as possible. A high percentage of glass fiber imparts greater hardness and toughness to layer of hard fiber-reinforced composite material 54 and is instrumental in improving thermal conductivity through slot armor 34. Layer of hard fiber-reinforced composite material 54 may, of course, be made of other materials such as, for example an aramid paper or a resin-bonded fabric matrix of a material other than glass fiber without departing from the scope of the invention.

Dielectric film 56 may be any convenient material having a suitable dielectric strength and toughness. In the preferred embodiment, dielectric film 56 is a polyimide polymer film made as the result of a polycondensation reaction between an aromatic tetrabasic acid and an aromatic diamine. One type of material suitable for use in dielectric film 56 is a polyimide film sold under the trademark Kapton Type F film by the DuPont Corp. This commercially available film is available with a lubricating coating corresponding to lubricating coating 58 of an FEP fluorocarbon sold under the trademark Teflon.

Kapton Type F film, as normally used, is a heat-sealable film which is bondable to itself when employed as a wrapping material and is bondable both to itself and to the copper conductors of a motor or generator when used as a wrapping material for these members. In the present invention, dielectric film 56 is bonded to layer of hard fiber-reinforced composite material 54. The slippery lubricating properties of FEP fluorocarbon in lubricating coating 58 and the toughness of this material is employed to permit rubbing at interface 46 between slot armor 34 and copper conductor 28 without producing abrasion.

When rubbing occurs at interface 46 between slot armor 34 and copper conductor 28, some of the FEP fluorocarbon in lubricating coating 58 wipes off onto copper conductor 28 at the points of contact. This creates a film of solid lubricant at interface 46. Slot armor 34 provides at least a five-fold improvement in abrasion resistance compared to any other slot armor material tested, including the slot armor material in the referenced prior patents.

The use of an FEP fluorocarbon as an outer coating on dielectric film 56 also improves the resistance of slot armor 34 to arcing. In a conventional slot armor, when a high potential begins to produce arcing, the surface of the slot armor tends to carbonize and to thus produce arc tracks which support the arcing. An FEP fluorocarbon in lubricating coating 58 tends to vaporize when subjected to arcing rather than to carbonize and thus resists the formation of arc tracks.

The absence from the present invention of the relatively good heat insulation of the non-woven aramid paper of the referenced patents provides about twice the heat conductivity through slot armor 34 as compared to that achieved with a material believed to be made according to the teachings of referenced U.S. Pat. No. 3,974,314. This is valuable in that it improves the discharge of heat from copper conductor 28 into rotor forging 12.

Figure 6:
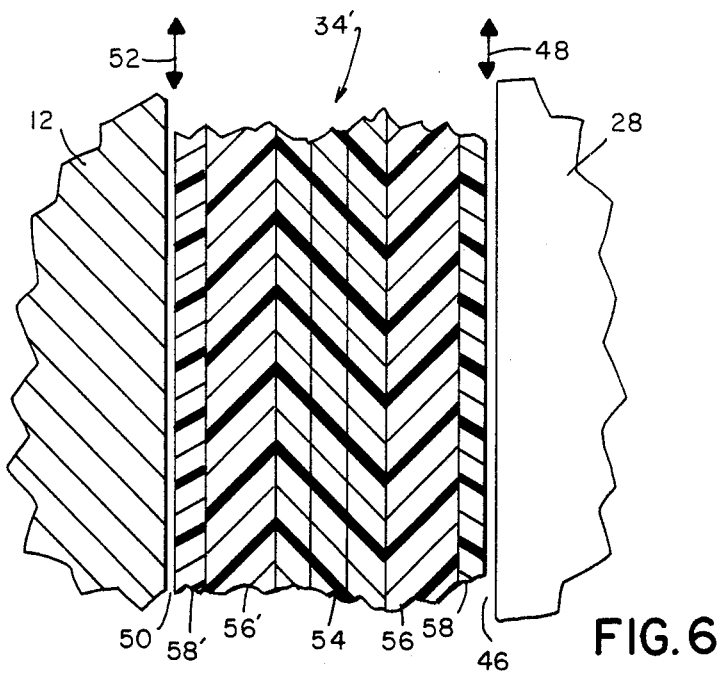
FIG. 6 is a close-up cross section of a slot armor according to a further embodiment of the invention.

Referring now to FIG. 6, an embodiment of the invention is shown in which a slot armor 34', otherwise similar to the embodiment of the invention in FIG. 5, includes a dielectric film 56' and a lubricating coating 58' adjacent interface 50 between slot armor 34 and axial slot 14. Although abrasion is less of a problem at interface 50 between slot armor 34 and axial slot 14 than it is at interface 46 between slot armor 34 and copper conductor 28, relative motion can exist between rotor forging 12 and slot armor 34', as indicated by double-headed arrow 52, which could lead to abrasion. In addition, the presence of lubricating coating 58' and dielectric film 56' in that location invokes the remaining desirable properties previously discussed in connection with dielectric film 56 and lubricating coating 58 in the embodiment of FIG. 5.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A slot armor material comprising at least one layer of a cured glass fiber-reinforced resin;
   a first dielectric film of a polyimide bonded to one surface of said layer, said first dielectric film being substantially co-extensive with said layer; and
   a solid lubricating coating of a fluorocarbon on the external surface of said first dielectric film, said solid lubricating coating being effective to permit lubricated sliding contact with said dielectric film without permitting substantial abrasion thereof.

2. A slot armor according to claim 1 wherein said polyimide film comprises a polimide polymer made as the result of a polycondensation reaction between an aromatic tetrabasic acid and an aromatic diamine.

3. A slot armor according to claim 1 wherein said fluorocarbon is FEP.

4. A slot armor according to claim 2 wherein said fluorocarbon is FEP.

5. A slot armor according to claim 1 further comprising:
   a second dielectric film of polyimide bonded to the other surface of said layer opposite said first dielectric film, said second dielectric film being substantially co-extensive with said layer; and,
   a solid lubricating coating of a fluorocarbon on the external surface of said second dielectric film.

6. A slot armor according to claim 1 wherein said glass fibers are in the form of a ply of glass fiber cloth.

7. A slot armor according to claim 1 wherein said resin is an epoxy resin.

8. A slot armor for separating a conductor of a dynamoelectric machine from a slot in a rotor containing said conductor comprising:
   a first layer of a hard, cured glass fiber-reinforced epoxy resin;

a second layer of a polyimide high-dielectric film bonded to the exterior surface of said first layer, said second layer being substantially co-extensive with said first layer;

said exterior surface being a surface facing said conductor in said dynamoelectric machine; and a lubricating coating of an FEP fluorocarbon on an exterior surface of said film, said lubricating coating being effective to permit lubricated sliding contact between said conductor and said film without permitting substantial abrasion thereof.

* * * * *